Aug. 5, 1941.   A. L. PARKER   2,251,716
COUPLING FOR TUBES
Filed March 20, 1939   2 Sheets-Sheet 2

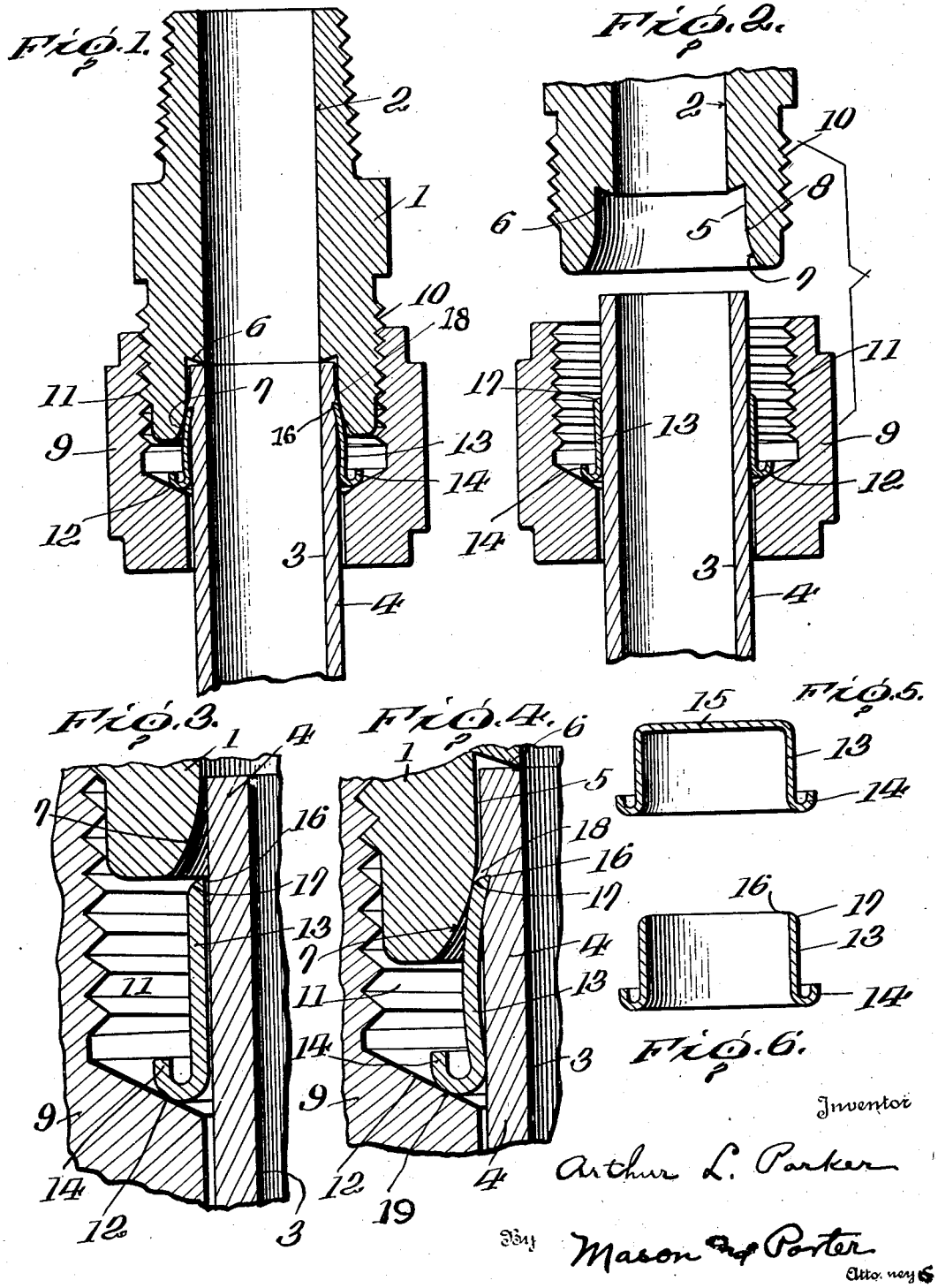

Inventor
Arthur L. Parker
By Mason & Porter
Attorneys

Patented Aug. 5, 1941

2,251,716

UNITED STATES PATENT OFFICE 2,251,716

COUPLING FOR TUBES

Arthur L. Parker, Cleveland, Ohio

Application March 20, 1939, Serial No. 262,965

3 Claims. (Cl. 285—123)

The invention relates to new and useful improvements in a coupling for tubes, and more particularly to a coupling for a tube end of uniform diameter wherein a gripping member surrounds the tube adjacent its end and is caused to grip the tube by cutting into the outer surface of the tube.

An object of the invention is to provide a coupling having a gripping member in the form of a sleeve of relatively thin drawn metal, which coupling is so constructed as to force the sleeve endwise of the tube and cause a cutting edge at the forward end of the sleeve to grip the tube by biting or cutting into the outer surface of the same.

A further object of the invention is to provide a coupling of the above type wherein one of the coupling members is bored to receive the tube end and wherein the entrance to the bore is flared outwardly to form a camming shoulder which is so shaped as to force the cutting end of the sleeve when it is brought into contact therewith into cutting engagement with the tube by a short turning movement of the coupling members relative to each other.

A still further object of the invention is to provide a coupling of the above type wherein a seat is provided against which the end of the tube is forced by the sleeve cutting into the tube.

A still further object of the invention is to provide a sleeve which may be used in securing a tube to a coupling, which sleeve can be made of drawn metal and which is so shaped that it may be readily deformed by the coupling members for securing the tube thereto.

These and other objects will in part be obvious and will in part be hereinafter more fully disclosed.

In the drawings which show by way of illustration one embodiment of the invention:

Fig. 1 is a sectional view of a tube coupling showing the tube end gripped and firmly secured thereto.

Fig. 2 is a view showing the coupling members separated and about to be connected for the gripping of a tube end.

Fig. 3 is an enlarged sectional view showing the male member inserted in the female member and the parts about to be connected.

Fig. 4 is a view similar to Fig. 3, showing the coupling members as threaded together and the gripping sleeve as having cut into the outer surface of the tube for gripping the same.

Fig. 5 is a view showing the gripping sleeve as drawn from sheet metal and first formed into cup-shape and the outer end thereof formed with a flange.

Fig. 6 shows the cutting away of the bottom of the sleeve and thus forming the cutting edge for the sleeve with a rounded outer face merging into the cut edge;

Figure 7:
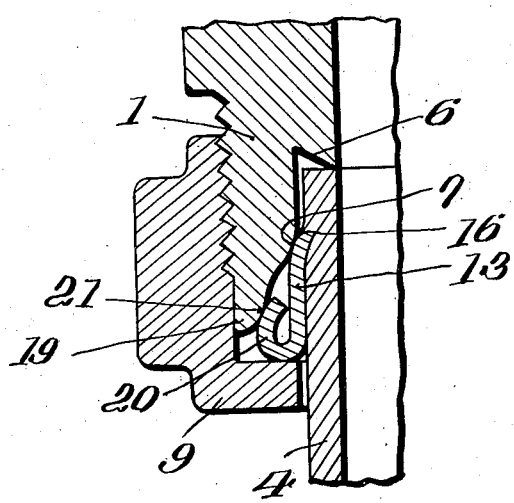
Fig. 7 is a sectional view on an enlarged scale showing a modified form of the invention.

A coupling embodying the improvements includes two coupling members having threaded engagement with each other. One of the coupling members has a bore which is slightly larger in diameter than the outer diameter of the end of the tube which is to be clamped. This bore at the entrance end thereto is flared outwardly so as to provide a camming shoulder. Associated with these coupling members which have threaded connection with each other is a gripping sleeve. A gripping sleeve is formed from metal by drawing. It may be drawn from a sheet of metal by die-shaping the blank into cup-shape and curving the open end of the cup to form an outturned flange and then cutting away the bottom wall of the cup so as to provide a cutting edge normally lying close to the outer surface of the tube, with the metal at the end of the sleeve curved and merging into the cutting edge, which lies in line with the inner wall of the sleeve. This sleeve is dimensioned so as to provide a loose fit on the tube end. The sleeve is so positioned in the coupling members that when they are threaded one on to the other, the forward rounded edge of the sleeve is brought into contact with the camming shoulder on the coupling member, and thus the cutting edge is caused to cut into the outer surface of the tube and form a tight gripping engagement therewith, so as to hold the tube in the coupling and prevent its being forcibly drawn therefrom. Preferably at the inner end of the bore there is a seat against which the tube end is placed before the coupling members are turned to cause the sleeve to cut into the tube. This serves as a means for positively preventing the tube from moving endwise, and assists greatly in the cutting into of the tube and the firm grip of the sleeve on the tube. Other means, however, may be provided for preventing the tube from moving endwise during the clamping of the same in the coupling.

It is thought that the invention will be better understood by a detail description of the illustrated embodiment thereof. The coupling consists of a member 1 which has a bore 2 therethrough of substantially the same diameter as the inner bore 3 of the tube 4 which is to be secured to the coupling. This coupling member 1 is also provided with a bore 5 of slightly larger diameter than the outer diameter of the tube so that the tube may be freely inserted in the bore. This bore 5 is preferably concentric with the bore 2 and terminates in a shoulder 6 against which the end of the tube may be placed. The entrance end of the bore 5 is flared outwardly as indicated at 7. As shown in the drawings, this outwardly flared surface is curved, although it is obvious that it might be straight and cone-shaped. The curved surface terminates substantially at the point 8 which is well back from the end of the tube when the tube is placed against the seat 6.

The other coupling member 9 has a bore therethrough which is slightly larger than the outer diameter of the tube so that the tube passes freely through this coupling member 9 and into the bore of the coupling member 1. The coupling member 1 is provided with a thread 10 which is adapted to engage a thread 11 on the coupling member 9. While the coupling member 1 is shown as the male member entering the female member 9, this may be otherwise arranged. It is essential, however, that some means shall be provided for joining the coupling members so that they may be drawn together when it is desired to clamp the end of the tube. The coupling member 9 is provided with a cone-shaped surface 12 and the inner threaded surface of the coupling member 9 is dimensioned so that a gripping sleeve 13 may be placed on the tube end and disposed in this recess with its outer end in contact with the cone-shaped surface 12. The sleeve 13 is made of drawn metal and is relatively thin. It may be made by drawing the same from a sheet of metal, in which case the blank or sheet from which the sleeve is formed is first made cup-shaped as shown in Fig. 5. What is to be the outer edge of the sleeve is either die-shaped or spun outwardly so as to form an abutment flange 14. The closed bottom end 15 of the sleeve is next cut out as shown in Fig. 6, and this leaves a cutting edge 16 with a rounded end 17 which curves gradually from the outer wall of the sleeve toward the inner wall and terminates in this cutting edge 16. As noted, this sleeve makes a loose fit with the tube, and when the coupling members are threaded together, the rounded end 17 of the sleeve will be brought into contact with the camming shoulder 7 of the coupling member 1. This curved camming shoulder will force the forward end of the sleeve toward the tube, contracting the same, and causing the cutting edge to shear the outer face of the tube as indicated at 18. It is this cutting into the outer face of the tube which causes the sleeve to grip the tube and hold it firmly in the coupling. The cone-shaped abutment wall 12 contacting with the outer flared end will engage the same at a point 19 which is outwardly disposed from a line passing longitudinally through the wall of the sleeve. This will tend to prevent the sleeve from buckling, and enables a sleeve of thinner metal to be used for cutting into the tube and firmly gripping the same. When the coupling member 1 is provided with the shoulder 6 forming the seat for the end of the tube, the tube is placed against this seat before the coupling members are moved so as to force the inner end of the sleeve into contact with the camming shoulder. This will prevent the tube from moving endwise during the cutting of the sleeve into the tube, and it will also cause the end of the tube to be firmly clamped against the end of the seat.

It will readily be seen that in view of the fact that the camming shoulder is curved, that the end of the sleeve will be contracted by a short turning movement of the coupling members relative to each other.

Inasmuch as the sleeve is made of drawn metal and relatively thin, it can be contracted at the advance edge thereof so as to cause the cutting edge to shear the outer surface of the tube with comparatively light wrench pressure on the coupling members. This contracting and shaping of the metal to cut into and grip the tube end is further facilitated by the drawing of the metal as distinguished from the machine tool cutting of a sleeve to shape from a blank.

Instead of die-shaping the sleeve from a blank in the manner described above, this sleeve may be made from a drawn metal tube by cutting it into proper length, and then spinning or die-shaping one end of it to form a flange, and by cutting or pressing the other end to form a cutting edge in line with the inner wall of the tube, and a round face leading from the cutting edge into the outer wall of the tube. When so formed, the advantages of a thin sleeve of drawn metal is obtained as described above.

It is noted that the main thrust is axially of the tube so that there is very little tendency to collapse the tube, and thus there is no noticeable reduction in the inner diameter of the tube at the region where the sleeve grips the same. It is also noted that the sleeve is slightly sprung when the coupling is tightened, and thus the yielding action of the sleeve holds the pipe firmly to its seat.

Figure 8:
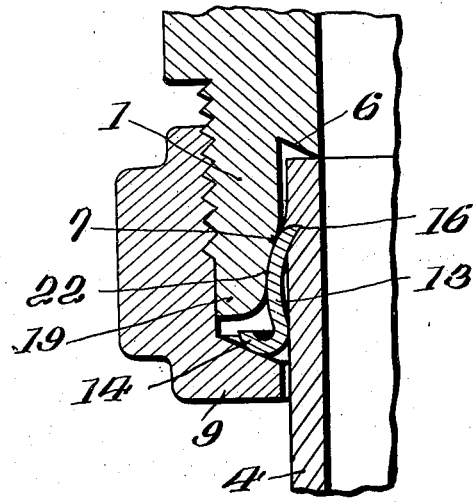
Fig. 8 is a sectional view on an enlarged scale showing a still further modified form of the invention.

In Fig. 7 there is shown a slightly modified form of the invention. The coupling member 1 is shown as extending beyond the camming shoulder 7 as indicated at 19. The sleeve 13 has its cutting end shaped as described above. The other end of the sleeve is rolled back to a greater extent as indicated at 20. The extension 19 is provided with a curved shoulder 21. When the coupling member or nut 9 is threaded on to the coupling member 1, the sleeve is forced along the tube and the cutting end 16 thereof is caused to cut into the tube. The camming shoulder 7 with which it contacts forces the cutting edge against the tube so as to cause this cutting action. The shoulder 19 on the extension contacting with a curved portion 20 will force it against the sleeve so as to prevent the sleeve from buckling under the pressure placed against the sleeve by the nut to produce this cutting action. In Fig. 8 there is shown a further modified form of the invention wherein the extension 19 is provided with a shaped face 22 spaced much closer to the tube, and this face contacts with the sleeve between the curled end 14 and the cutting edge 16 so as to prevent buckling. The camming shoulder 7 operates as described above to contract the sleeve and cause the cutting edge to cut into the tube.

Figure 9:
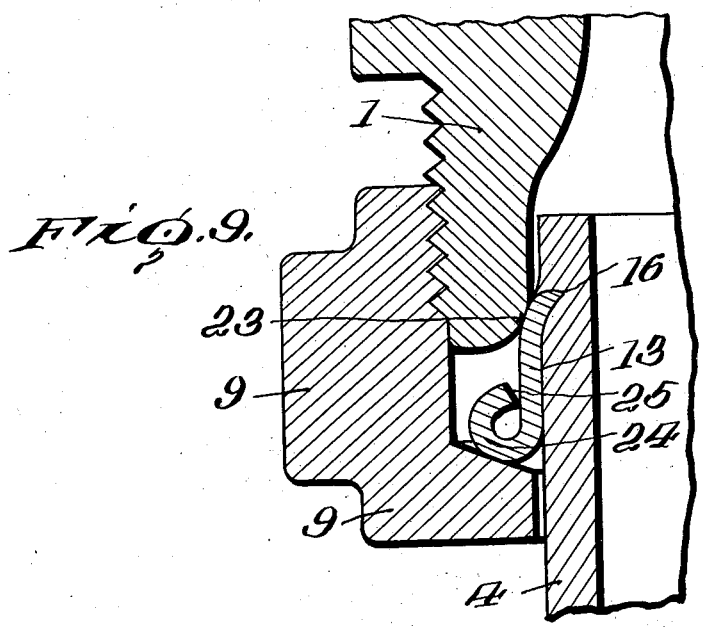
Fig. 9 is a sectional view on an enlarged scale showing another modified form of the invention.

In Fig. 9 there is shown a still further modified form of the invention. While in the preferred form of the invention, the coupling is provided with a seat 6 against which the tube end abuts, this seat may be omitted, as has already been suggested. The coupling member 1 is provided with a camming shoulder 23 which is more sharply curved than shown in the other figures. The sleeve 13 is rolled back upon itself as indicated at 24 so that the nut or coupling member 9, when contacting therewith, will tend to force the end 25 of the rolled portion into contact with the sleeve. As noted, the camming shoulder 23 is more sharply curved, and therefore, the sleeve at the cutting end will be contracted by a much shorter movement of the coupling members relative to each other, and this contracting of the sleeve will cause the cutting edge to bite into the sleeve as indicated in Fig. 9.

From the above description, it will be noted that a sleeve has been provided which is very useful in connection with securing tubes to coupling members. The sleeve is made of drawn metal and is made very thin and yet is provided with an abutment shoulder whereby the sleeve may be forced endwise for bringing about a clamping of the tube. The sleeve is also shaped at the opposite end from the abutment so that it may be readily contracted or deformed and the edge thereof brought into contact with the tube for providing a holding grip thereon.

It is obvious that many changes may be made in details of construction without departing from the spirit of the invention as set forth in the appended claims.

Having thus described the invention, what I claim as new and desire to secure by Letters Patent, is—

1. A coupling for tubes including a coupling member having a bore terminating at its inner end in a seat and a camming shoulder at the entrance thereto, a thin metallic sleeve of substantially uniform thickness disposed on said tube, said sleeve at the inner end being tapered and terminating in a relatively sharp cutting edge, a second coupling member adapted to engage said sleeve and move the same against the camming shoulder, said camming shoulder being disposed and shaped so as to contact with the outer face of the sleeve back from and adjacent the cutting edge, whereby said sleeve is contracted and the cutting edge forced into engagement with the tube so as to cut into said tube in the general direction of its length for holding the tube in engagement with the seat, said sleeve at its outer end being rolled outwardly to form an abutment against which the second-named coupling member engages.

2. A coupling for tubes including a coupling member having a bore terminating at its inner end in a seat against which the end of the tube abuts, said member having a camming shoulder at the entrance to the bore, a thin metallic sleeve disposed on said tube, said sleeve at the inner end being tapered and terminating in a relatively sharp cutting edge, a second coupling member adapted to engage said sleeve and move the same against the camming shoulder, said camming shoulder being disposed and shaped so as to contact with the outer face of the sleeve back from and adjacent the cutting edge whereby said sleeve is contracted and the cutting edge positioned for cutting the wall of said tube when forced endwise thereof for securing the tube to the coupling.

3. A coupling for tubes including a coupling member having a bore terminating at its inner end in a seat against which the end of the tube abuts, said member having a camming shoulder at the entrance thereto, a thin metallic sleeve disposed on said tube, said sleeve at the inner end being tapered and terminating in a relatively sharp cutting edge, a second coupling member adapted to engage said sleeve and move the same against the camming shoulder, said camming shoulder being disposed and shaped so as to contact with the outer face of the sleeve back from and adjacent the cutting edge whereby said sleeve is contracted and the cutting edge positioned for cutting the wall of said tube when forced endwise thereof for securing the tube to the coupling, said first-named coupling member having an extension provided with means for contacting with said sleeve intermediate the ends thereof so as to prevent the sleeve from buckling when forced by the second coupling member into the tube.

ARTHUR L. PARKER.